United States Patent
Le et al.

(10) Patent No.: US 11,216,759 B2
(45) Date of Patent: Jan. 4, 2022

(54) REAL-TIME ECONOMIC DISPATCH METHOD OF POWER SYSTEM

(71) Applicant: SHANGHAI JIAO TONG UNIVERSITY, Shanghai (CN)

(72) Inventors: Xinyi Le, Shanghai (CN); Sijie Chen, Shanghai (CN); Xiaomeng Fang, Shanghai (CN); Zheng Yan, Shanghai (CN); Juntong Xi, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 348 days.

(21) Appl. No.: 16/345,326

(22) PCT Filed: Mar. 6, 2018

(86) PCT No.: PCT/CN2018/078166
§ 371 (c)(1),
(2) Date: Apr. 26, 2019

(87) PCT Pub. No.: WO2019/134254
PCT Pub. Date: Jul. 11, 2019

(65) Prior Publication Data
US 2021/0224708 A1 Jul. 22, 2021

(30) Foreign Application Priority Data
Jan. 2, 2018 (WO) ................ PCT/CN2018/070053

(51) Int. Cl.
*G06Q 10/06* (2012.01)
*G05B 13/02* (2006.01)
(Continued)

(52) U.S. Cl.
CPC ..... *G06Q 10/06313* (2013.01); *G05B 13/027* (2013.01); *G05B 13/042* (2013.01);
(Continued)

(58) Field of Classification Search
CPC ................ G06N 3/04; G06Q 50/06
(Continued)

(56) References Cited

U.S. PATENT DOCUMENTS 8,756,047 B2 * 6/2014 Patel .................. G06N 3/08
703/18
9,742,411 B1 * 8/2017 Fan .................. G05B 11/01
(Continued)

FOREIGN PATENT DOCUMENTS

CN 106203683 A 12/2016
CN 106856322 A 6/2017
(Continued)

OTHER PUBLICATIONS

He, et al, "Distributed Power Management for Dynamic Economic Dispatch in the Multimicrogrids Environment" IEEE Transactions on Control Systems Technology, vol. 27, No. 4, Jul. 2019, pp. 1651-1658.*
(Continued)

*Primary Examiner* — Md Azad
(74) *Attorney, Agent, or Firm* — Fitch, Even, Tabin & Flannery LLP

(57) ABSTRACT

A method for optimizing total load distribution of a power system includes the following steps: determining system initial data, and describing the power system in forms of nodes, branches, and parameters; determining an optimization objective and a constraint condition according to a problem, to construct a real-time economic dispatch model; setting a topology structure between the nodes; constructing a neural network for each node, and setting a parameter; setting an initial variable of the neural network; performing optimization by means of the neural network; determining whether a termination condition is satisfied, and outputting a result when the termination condition is satisfied, or repeating the neural network optimization when the termination condition is not satisfied.

7 Claims, 8 Drawing Sheets

(51) Int. Cl.
  *G05B 13/04* (2006.01)
  *G06N 3/04* (2006.01)
  *G06Q 50/06* (2012.01)
(52) U.S. Cl.
  CPC ............ *G06N 3/04* (2013.01); *G06Q 10/067* (2013.01); *G06Q 50/06* (2013.01)
(58) Field of Classification Search
  USPC ........................................................ 700/291
  See application file for complete search history.

(56) References Cited

U.S. PATENT DOCUMENTS

| | | | | |
|---|---|---|---|---|
| 2014/0025352 A1* | 1/2014 | Ghosh | ................. | G06F 17/10 703/2 |
| 2015/0134132 A1* | 5/2015 | Feng | ................. | H02J 4/00 700/286 |
| 2017/0317499 A1* | 11/2017 | Tang | ................. | H02J 13/00 |

FOREIGN PATENT DOCUMENTS

| | | |
|---|---|---|
| CN | 107145976 A | 9/2017 |
| EP | 2942855 A1 | 11/2015 |

OTHER PUBLICATIONS

Bernieri, et al. "Neural Networks and Pseudo-Measurements for Real-Time Monitoring of Distribution Systems", IEEE Tr. on Instrument and Measumenet, V-45, No. 2, Apr. 1996, pp. 645-650.*

Xia, et al. "Optimal dynamic economic dispatch of generation: A review", Electric Power Systems Reserch 80, Feb. 2010, pp. 975-986.*

* cited by examiner

REAL-TIME ECONOMIC DISPATCH METHOD OF POWER SYSTEM

FIELD OF THE INVENTION

The present invention relates to the field of power system real-time economic dispatch, and in particular to a distributed real-time economic dispatch method based on a neural network.

DESCRIPTION OF THE PRIOR ART

A power system consists of a power supply (generator), a load, and a power transmission network. A topology structure of the power network is a connected graph, and the generator and the load are located at each node in the network. In regard to a real-time economic dispatch problem, it needs to determine how to allocate a total load of the power system at a certain moment to all machine sets, to minimize power generation costs on the premise that power supply and demand are balanced in the whole system, a line power flow does not exceed a limit, and output of each generator is within a limit value thereof.

In recent years, there is an increasing tendency to solve the real-time economic dispatch problem by means of a distributed (instead of centralized) algorithm in the power industry. In a real-time economic dispatch problem, on the one hand, each node has a local objective function (power generation cost minimization of the node) and a decision variable, which is the output of the generator; on the other hand, outputs of generators of all of the nodes are coupled, which is reflected as an energy balance equation constraint and a line capacity inequation constraint. Therefore, the distributed real-time economic dispatch problem can be described as an optimization problem comprising the local decision variable and the global coupling constraints and needing to be solved in real time. Each node determines a power generation amount thereof by coordinating to communicate with a node connected thereto, so that a total power generation amount and the total load reach a real-time balance, the line capacity constraint is satisfied, and a total power generation cost of all of the nodes is minimum.

However, there is still a limitation in the existing distributed solving technology algorithm of the real-time economic dispatch. A calculation time of a discrete distributed solving technology is excessively long, thereby not satisfying a timeliness requirement of the real-time economic dispatch. A continuous distributed solving technology, which is currently mainly for an optimization problem comprising a local constraint, can implement the real-time solving, but cannot process an optimization problem comprising numerous global inequation constraints; while the real-time economic dispatch problem comprises numerous global inequation constraints such as a line power flow.

SUMMARY OF THE INVENTION

In view of the above-mentioned defects of the prior art, the present invention is aimed at overcoming a bottleneck that a calculation efficiency is low and the global inequation constraints such as the line power flow are difficult to be efficiently processed in the existing solving technology of the real-time economic dispatch, and put forwards an efficient distributed real-time economic dispatch method that can correctly consider actual constraints in power dispatch.

The present invention provides a real-time economic dispatch method adopting a distributed neural network, and the method mainly comprises the following content and steps:

(1) Define, according to a problem model, an optimization objective of each node and global equation and inequation constraints needing to be satisfied between the nodes;

(2) Design an information interaction mechanism between the nodes according to a topology structure of a node network;

(3) Construct a neural network for each node, and set a related parameter of the neural network;

(4) Randomly select an initial value of a status variable in the neural network, and perform optimization calculation by means of the neural network;

(5) Determine convergence according to a convergence criterion of a neural network cluster.

Specifically, the real-time economic dispatch method of a power system provided by the present invention comprises the following steps: S1. Determine system initial data, and describe the power system in forms of nodes, branches, and parameters; S2. Determine an optimization objective and a constraint condition according to a problem, to construct a real-time economic dispatch model; S3. Set a topology structure between the nodes; S4. Construct a neural network for each node, and set a parameter; S5. Set an initial variable of the neural network; S6. Perform optimization by means of the neural network; S7. Determine whether a termination condition is satisfied, and output a result when the termination condition is satisfied, or repeat step S6 when the termination condition is not satisfied.

In an embodiment of the present invention, the constraint condition comprises one or more of the following constraints: a power supply-demand balance equation constraint, a line power flow capacity inequation constraint, and upper-lower output limit constraint of each generator.

In another embodiment of the present invention, step S3 comprises: set physically connected nodes to exchange information with each other in communication, wherein the node can notify other nodes connected thereto of a current status value of each parameter or physical quantity thereof, and receive, from other nodes connected thereto, current status values of parameters or physical quantities corresponding to said other nodes.

In another embodiment of the present invention, step S7 comprises: output the result when a convergence precision is reached; or report an error when the convergence precision is not reached and a maximum calculation time is reached; or repeat step S6 when the convergence precision is not reached and a maximum calculation time is not reached.

In another embodiment of the present invention, the neural network is implemented by means of a programmable circuit.

In another embodiment of the present invention, the real-time economic dispatch model is:

$$\min f(x) = \sum_{i=1}^{m} f_i(x_i)$$

$$\text{s.t.} Ax = b$$

$$g(x) \leq 0$$

$$x \in \Omega$$

wherein $x_i$ represents a decision variable of each node, which is output of a generator;

$f_i$ represents an objective function on each node i, which is power generation cost minimization of the node;

g (x)≤0 is a global inequation constraint satisfying additivity, and represents a line capacity, wherein $$g(x) := \sum_{i=1}^{m} g_i(x_i),$$

and $g_i: \mathfrak{R}^{n_i} \to \mathfrak{R}^r$ is convex in $\Omega_i (i=1, 2 \ldots, m)$;

Ax=b is a global equation constraint which can be decomposed into $$Ax = \sum_{i=1}^{m} A_i x_i,$$

and represents an energy balance between the nodes, wherein $A_i \in \mathfrak{R}^{p \times n_i}$, and $b \in \mathfrak{R}^p (0 \le p \le n)$; $x \in \Omega$, wherein $\Omega$ is a convex set, $x \in \Omega$ is equivalent to $x_i \in \Omega_i$ (i=1,2, ... m), and $\Omega = \Pi_{i=1}^{m} \Omega_i$, $\Omega_i (i=1, 2 \ldots, m)$.

In another embodiment of the present invention, the following neural network is constructed for each node:

$$\begin{cases} \dot{o}\frac{d}{dt}x_i = P_{\Omega_i}(x_i - \nabla f_i(x_i) + A_i^T u_i - \nabla g_i^T(x_i)\lambda_i) - x_i \\ \dot{o}\frac{d}{dt}u_i = -\sum_{j \in N_i}(u_i - u_j + v_i - v_j) - \left(A_i x_i - \frac{b}{m}\right) \\ \dot{o}\frac{d}{dt}v_i = \sum_{j \in N_i}(u_i - u_j) \\ \dot{o}\frac{d}{dt}\lambda_i = \left(\lambda_i + g_i(x_i) - \sum_{j \in N_i}(\gamma_i - \gamma_j + \lambda_i - \lambda_j)\right)^+ - \lambda_i \\ \dot{o}\frac{d}{dt}\gamma_i = \sum_{j \in N_i}(\lambda_i - \lambda_j) \end{cases}$$

wherein

ò represents a direct scale factor, and ò>0;

$x_i$, $u_i$, $v_i$, $\lambda_i$, and $\gamma_i$ represent status vectors of an $RNN_i$ (a recursive neural network i);

$\nabla$ represents a differential gradient operator;

$N_i$ represents a vertex set of a neighboring network of the $RNN_i$, that is, $j \in N$, when and only when the node i and the node j are connected;

m represents a number of the nodes;

$P_\Omega$ represents a projection operator, and $$P_\Omega(\mu) = \arg \min_{\omega \in \Omega} \|\mu - \omega\|;$$

and all of the nodes satisfy the global equation constraint $$\sum_{i=1}^{m} A_i x_i = b$$

and the inequation constraint $$g(x) = \sum_{i=1}^{m} g_i(x_i) \le 0,$$

wherein $A_i \in \mathfrak{R}^{p \times n_i}$; $b \in \mathfrak{R}^p (0 \le p \le n)$; $g_i: \mathfrak{R}^{n_i} \to \mathfrak{R}^r$ is convex in $\Omega_i (i=1,2 \ldots, m)$; $f_i: \mathfrak{R}^{n_n} \to \mathfrak{R}^r$ is a local objective function on the node i.

In another embodiment of the present invention, the neural network on each node exchanges $u_i$, $v_i$, $\lambda_i$, and $\gamma_i$ thereof with the node connected thereto, and only a local objective $f_i$ on the node is optimized; and a global optimal solution can be obtained when all of the nodes are consistent on $u_i$, $v_i$, $\lambda_i$, and $\gamma_i$, so that a global objective $$\sum_{i=1}^{m} f_i(x_i)$$

is optimal when the constraint condition is satisfied.

In another embodiment of the present invention, step S5 comprises: an initial status of the neural network can be any value under a condition that continuity and convexity of the optimization problem and interconnection between the distributed network nodes are ensured.

In another embodiment of the present invention, step S7 comprises: S7.1. Determine whether the convergence precision is reached, that is, determine whether $$\sum_{i=1}^{m} \|x_i(t + \delta t) - x_i(t)\| < \varepsilon$$

is satisfied, and if the inequation is satisfied, that is, the iteration termination condition is satisfied, output $x_i(t)$ of a moment t as the output result; otherwise, perform a next step of determination, wherein ε is a set iteration precision, and δt is an interval time; S7.2. Determine whether a calculation time t reaches the maximum calculation time $t_{max}$, and if the maximum calculation time $t_{max}$ is reached, end the operation; otherwise, repeat step S6.

In the method provided by the present invention, the optimal solution can be obtained by means of convergence in milliseconds, and a convergence time does not increase when a problem scale increases, thereby processing a continuous-time signal in real time and implementing online optimization. The neural dynamical network can converge to the global optimal solution from any initial status under the condition that the continuity and the convexity of the optimization problem and the interconnection between the distributed network nodes are ensured. In addition, no any centrum is required to process the global constraints or coordinate these neural dynamical models. Therefore, the method is particularly applicable to an optimization problem of a complex objective function and a relatively simple global constraint, to efficiently improve a calculation rate, reduce a communication loss, and decrease a size of the programmable circuit.

The concept, specific structure, and produced technical effects of the present invention will be further described below with reference to the drawings, so as to fully understand the purposes, features and effects of the present invention.

DETAILED DESCRIPTION OF THE PREFERRED EMBODIMENTS

Multiple preferred embodiments of the present invention are described below with reference to the drawings of the description, to make the technical content clearer and easier to be understood. The present invention can be implemented by many embodiments in different forms, and the protection scope of the present invention is not limited to the embodiments described below.

In the following description, many specific details are provided to more thoroughly understand the present application. However, it is obvious to those skilled in the art that the present application can be embodied without one or more of these details. It should be understood that the present application can be embodied in different forms and should not be construed as being limited to the embodiments provided herein. Rather, these embodiments are provided to make the technical content of the present application clearer and easier to understand.

The technical solutions of the present invention are described below in detail with reference to the specific embodiments of the present invention.

The present invention provides a real-time economic dispatch method, to construct a real-time economic dispatch model for a whole system. The system consists of multiple nodes. A neural network can be constructed for each node in the system, and a neural network optimization model of each node is designed. Then, a neural network parameter is set according to an optimization problem and a constraint condition, optimization solving is performed by means of the neural network, and a result is output until an iteration termination condition is satisfied.

Figure 1:
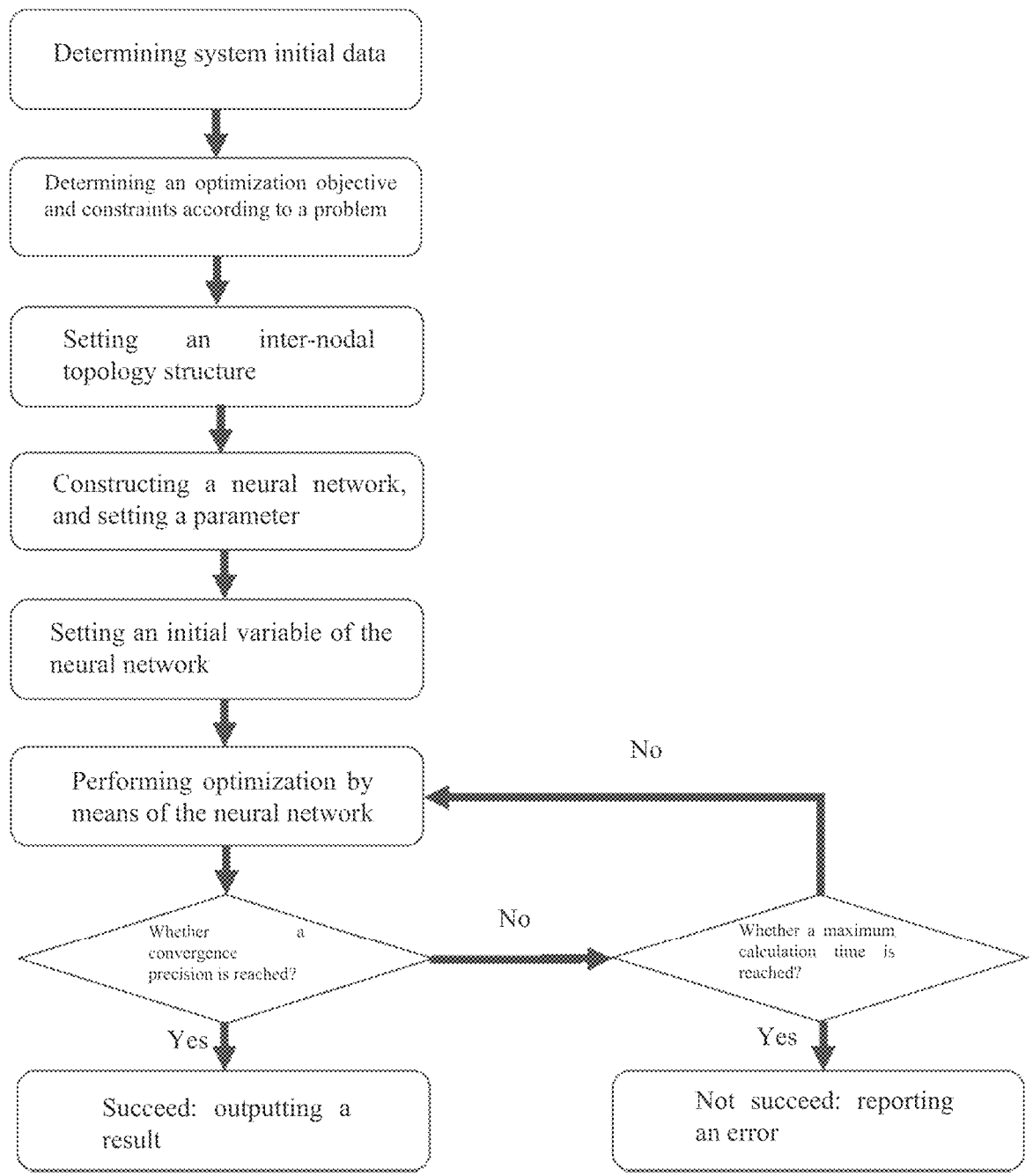
FIG. 1 is a flow chart of a real-time economic dispatch method according to one embodiment of the present invention.

FIG. 1 shows a flow chart of the real-time economic dispatch method according to one embodiment of the present invention, which comprises the following steps:

(1) Determine system initial data: describe the power system in forms of nodes, branches, and parameters, and determine or input data of each node and branch and a value of each parameter.

(2) Determine an optimization objective and constraints according to the problem: according to actual needs or real problems, determine the overall and/or local optimization objectives of the system, and determine each constraint condition in the system, which can comprise a power supply-demand balance equation constraint, a line power flow capacity inequation constraint, and upper-lower output limit constraint of each generator, and a combination of one or more of the constraints.

The real-time economic dispatch model of the system can be constructed according to the various parameters, the data, and the constraint condition.

(3) Set a topology structure between the nodes: set a connection situation or physical connection relationship between the nodes. In one embodiment, physically connected nodes can be set to exchange information with each other in communication. Specifically, the node j can notify other nodes connected thereto of a current status value of each parameter or physical quantity thereof, and receive, from said other nodes, current status values of parameters or physical quantities corresponding to said other nodes.

(4) Construct a neural network, and set a parameter: construct the neural network on each node, and set the parameter related to the neural network.

(5) Set an initial variable of the neural network: randomly select any real number or vector for the initial status variable of the neural network of each node. In one embodiment, all initial values can be set to be 0, so as to facilitate calculation.

(6) Perform optimization by means of the neural network: perform distributed optimization solving by means of the neural network on the basis of the constructed real-time economic dispatch model. Eventually, a decision variable converges in a specific time, and auxiliary multipliers are consistent and converge to a steady state, thereby implementing the real-time solving of the neural dynamical method.

(7) Determine whether a termination condition is satisfied, wherein determination of the termination condition can comprise synchronous or sequential determination of one or more of the following conditions: whether a convergence precision is reached, whether a maximum calculation time is reached, and the like. In one embodiment, whether the convergence precision is reached is first determined; and if the convergence precision is reached, a success is indicated and a result is output. If the convergence precision is not reached, it continues to determine whether the maximum calculation time is reached; and if the maximum calculation time is reached, a failure is indicated and an error indication is output or an error is reported. If the maximum calculation time is not reached, step (6) is repeated, to continue to perform the optimization by means of the neural network. The parameters or thresholds such as the convergence precision and the maximum calculation time can be preset, or can be dynamically adjusted according to a related parameter or variable.

Specifically, in one embodiment, the real-time economic dispatch model can be generally expressed as:

$$\min f(x) = \sum_{i=1}^{m} f_i(x_i)$$
$$\text{s.t.} Ax = b$$
$$g(x) \le 0$$
$$x \in \Omega$$

wherein $x_i$ represents a decision variable of each node, which is output of a generator;

$f_i$ represents an objective function on each node i, which is power generation cost minimization of the node in the economic dispatch problem;

$g(x) \le 0$ is a global inequation constraint satisfying additivity, and is used to represent a line capacity, wherein $$g(x) := \sum_{i=1}^{m} g_i(x_i),$$

and $g_i: \Re^{n_i} \to \Re^r$ is convex in $\Omega_i (=1,2\ldots, m)$;

Ax=b is a global equation constraint which can be decomposed into $$Ax = \sum_{i=1}^{m} A_i x_i,$$

and represents an energy balance between the nodes in the economic dispatch problem, wherein $A_i \in \Re^{p \times n_i}$, and $b \in \Re^p (0 \le p \le n)$;

$x \in \Omega$, wherein $\Omega$ is a convex set, $x \in \Omega$ is equivalent to $x_i \in \Omega_i (i=1,2,\ldots, m)$, and $\Omega = \Pi_{i=1}^{m} \Omega_i$, $\Omega_i (=1,2\ldots, m)$.

In one embodiment, a recursive neural network model $RNN_i$ for each node i (i=1, 2, . . . , m) can be expressed in the following form:

$$\begin{cases} \dot{o} \frac{d}{dt} x_i = P_{\Omega_i}(x_i - \nabla f_i(x_i) + A_i^T u_i - \nabla g_i^T(x_i)\lambda_i) - x_i \\ \dot{o} \frac{d}{dt} u_i = -\sum_{j \in N_i}(u_i - u_j + v_i - v_j) - \left(A_i x_i - \frac{b}{m}\right) \\ \dot{o} \frac{d}{dt} v_i = \sum_{j \in N_i}(u_i - u_j) \\ \dot{o} \frac{d}{dt} \lambda_i = \left(\lambda_i + g_i(x_i) - \sum_{j \in N_i}(\gamma_i - \gamma_j + \lambda_i - \lambda_j)\right)^+ - \lambda_i \\ \dot{o} \frac{d}{dt} \gamma_i = \sum_{j \in N_i}(\lambda_i - \lambda_j) \end{cases}$$

wherein

ò represents a direct scale factor, and ò>0;

$x_i$, $u_i$, $v_i$, $\lambda_i$, and $\gamma_i$ represent status vectors of the $RNN_i$ (recursive neural network i);

$\nabla$ represents a differential gradient operator;

$N_i$ represents a vertex set of a neighboring network of the $RNN_i$, that is, $j \in N_i$ when and only when the node i and the node j are connected;

m represents a number of the nodes;

$P_\Omega$ represents a projection operator, and $$P_\Omega(\mu) = \arg \min_{\omega \in \Omega} \|\mu - \omega\|.$$

In one embodiment, an information interaction mechanism between neural networks of all of the nodes can be designed according to the topology structure of the node network.

Figure 2:
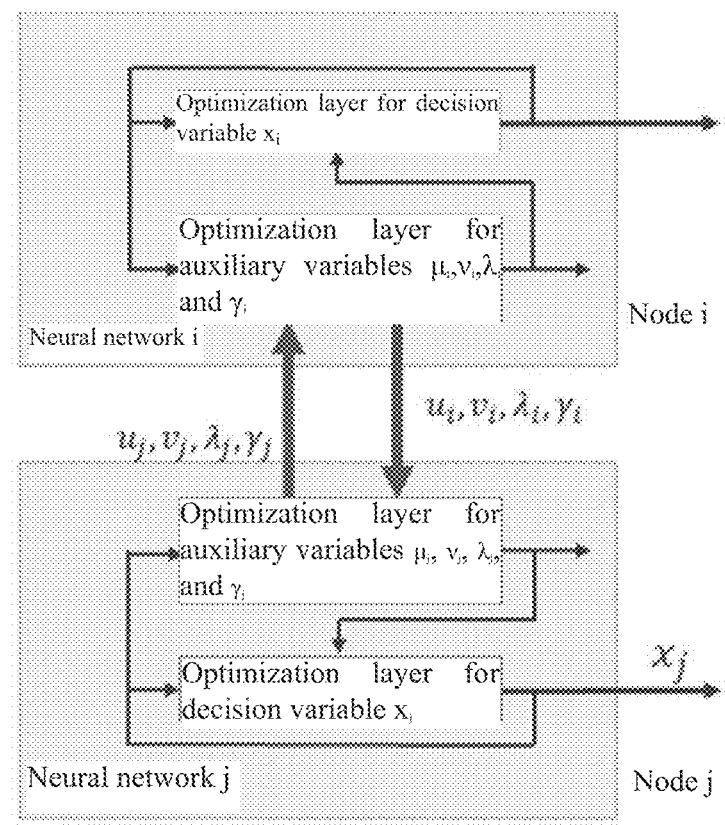
FIG. 2 is a neural network interaction view according to one embodiment of the present invention.

FIG. 2 shows a neural network interaction view according to one embodiment of the present invention. Each recursive neural network $RNN_i$ stores the variable x, in an inside thereof and outputs the auxiliary variables $u_i$, $v_i$, $\lambda_i$, and $\gamma_i$ to only the neighboring network. Each node exchanges information with only the nodes connected thereto.

Such a distributed neural network protects privacy and autonomy of each node. Information of only the auxiliary variables $t_i$, $v_i$, $\lambda_i$, and $\gamma_i$ is exchanged between the nodes, while information of the decision variable $x_i$ is not exchanged, thereby protecting the privacy of each node. Each node can define the local optimization objective $f_i$ and a local feasible region $x_i \in \Omega_i$ thereof, thereby protecting the autonomy of each node.

In one embodiment, the neural network parameter can be set to $\dot{o}=10^{-4}$, and the neural network parameters $A_i$, b, $\nabla f_i$, $g_i$, $\nabla g_i$, and $\Omega_i$ of the node i are determined according to the optimization problem and the constraints.

In one embodiment, any real number (vector) can be selected for the initial status variable of the neural network of each node.

In one embodiment, an inner structure of the neural network can be designed according to the set neural dynamical model, and a corresponding circuit can be operated on a programmable circuit (a field programmable gate array FPGA, and a digital signal processor DSP).

In one embodiment, a convergence criterion of a neural network cluster can be constructed according to actual needs of a structure of the system or the network.

Figure 3:
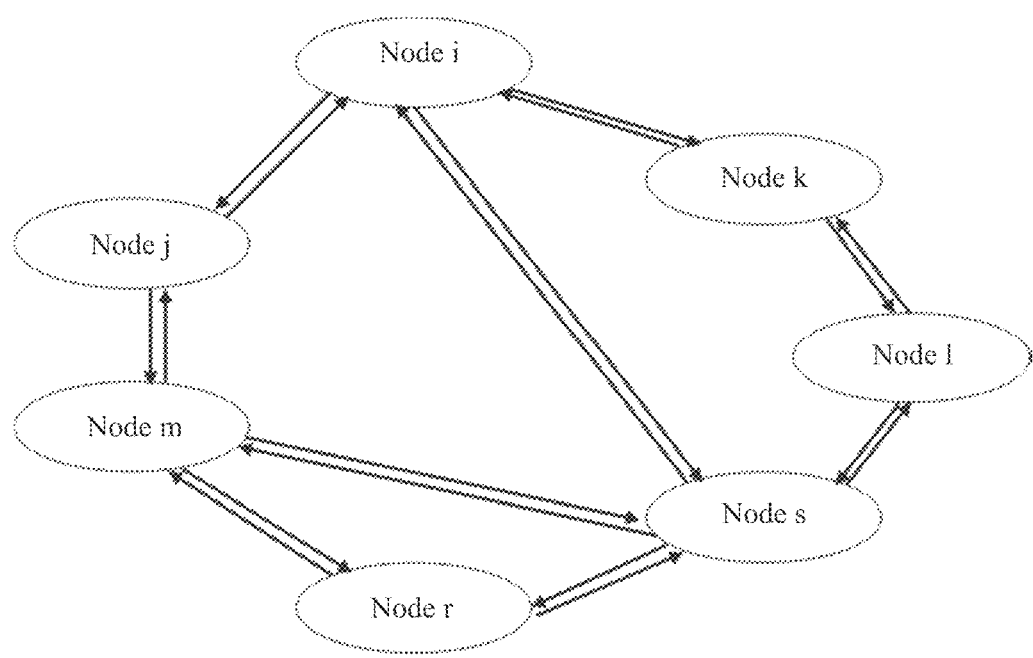
FIG. 3 is a structural schematic view of an all-connected-node network according to one embodiment of the present invention.

FIG. 3 shows a structural schematic view of an all-connected-node network according to one embodiment of the present invention. The network nodes are non-directional and interconnected, and the local utility function $f_i$ of each node is a convex function and continuously differentiable. Optionally, the end condition for determining whether the convergence is satisfied can be specifically described as the following two steps:

(1) First determine whether the convergence precision is reached, that is, determine whether $$\sum_{i=1}^{m} \|x_i(t + \delta t) - x_i(t)\| < \varepsilon$$

is satisfied, and if the inequation is satisfied, that is, the iteration termination condition is satisfied, output $x_i(t)$ of a moment t as the calculation result; otherwise, perform a next step of determination, wherein ε is a set iteration precision, and δt is an interval time.

(2) Determine whether a calculation time t reaches the maximum calculation time $t_{max}$, and if $t_{max}$ is reached, that is, the iteration termination condition is satisfied, end the operation and report an error or re-perform the neural network optimization method; otherwise, that is, the iteration termination condition is not satisfied, continue to perform the operation.

Figure 4:
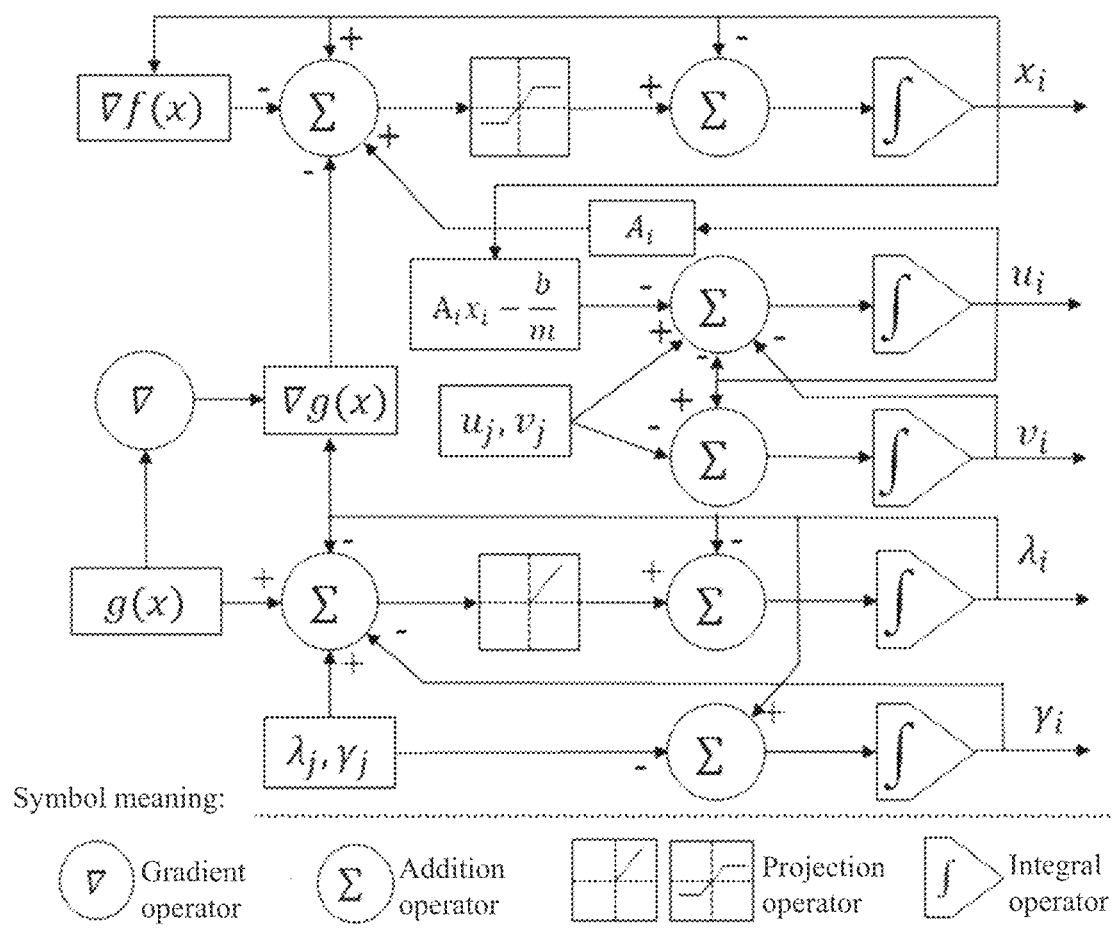
FIG. 4 is a view of an inner structure of a neural network according to one embodiment of the present invention.

FIG. 4 shows a view of the inner structure of the neural network according to one embodiment of the present invention. In such a distributed neural network, the method provided by the present invention can be implemented by means of the programmable circuit (such as the FPGA, and the DSP), wherein the direct scale factor generally can be $10^{-4}$-$10^{-8}$. On the basis of such a model and structure, in the method provided by the present invention, an optimal solution can be obtained by means of convergence in milliseconds, and a convergence time does not increase when a problem scale increases, thereby processing a continuous-time signal in real time and implementing online optimization.

The neural dynamical network can converge to the global optimal solution from any initial status under the condition that continuity and convexity of the optimization problem and interconnection between the distributed network nodes are ensured. In addition, in regard to the neural dynamical model, no any centrum is required to process the global constraints or coordinate these neural dynamical models.

Therefore, the distributed neural network is particularly applicable to an optimization problem of a complex objective function and a relatively simple global constraint. In regard to such problem, the method can efficiently improve a calculation rate, reduce a communication loss, and decrease a size of the programmable circuit.

Figure 5:
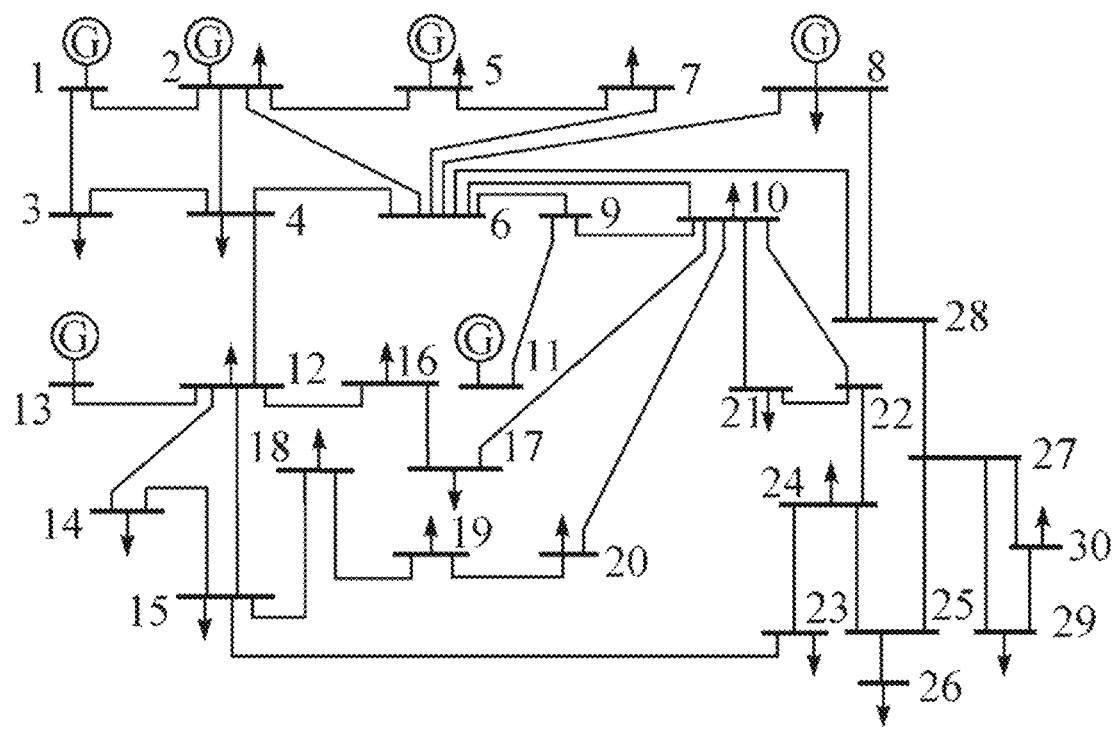
FIG. 5 is a structural schematic view of Institute of Electrical and Electronics Engineers IEEE-30 nodes according to one embodiment of the present invention.

The following further describes the present invention in detail by using an IEEE-30 node standard test system as an example. FIG. 5 shows a structural schematic view of the IEEE-30 nodes. The system is derived from a local power system for Midwestern America in December 1961, and comprises 30 nodes, wherein six nodes each has one generator. The objective function of the distributed optimization problem is in a form of quadratic convex function summation, the variable is power injection of each node, and the constraint condition comprises the power supply-demand balance equation constraint, the line (line 4-12) power flow capacity inequation constraint, and the upper-lower output limit constraint of each generator. In one embodiment, the method provided by the present invention comprises the following steps:

(1) Determine system initial data: describe the power system in forms of nodes, branches, and parameters, and determine or input data of each node and branch and a value of each parameter. In one embodiment, the real-time economic dispatch model can be expressed as:

$$\min \sum_{i \in Bus} C_i(p_i);$$

$$\text{s.t., } \sum_{i \in Bus} p_i = 0;$$

$$\sum_{i \in Bus} S_{ij} p_i \leq L_j, j \in \text{Line};$$

$$p_i^{Min} \leq p_i \leq p_i^{Max}, i \in \text{Bus};$$

wherein
Bus represents a node set;
Line represents a branch set;
$p_i$ represents the power injection of the node i, which is used as the decision variable;
$C_i(p_i)$ represents a cost function of the node i;
$S_{ij}$ represents a contribution factor of the node i for a power flow of a branch j;
$L_j$ represents a capacity of the branch j;
$p_i^{Min}$ represents a power injection lower limit of the node i;
$p_i^{Max}$ represents a power injection upper limit of the node i.

Data adopted in one embodiment is the same as data of the IEEE-30 node standard test system. All of the costs functions of the six generator nodes are convex quadratic functions, which are $C_i(p_i)=a_i p_i^2+b_i p_i$. Parameters of each generator are as follows:

| | Node corresponding to the generator | | | | | |
|---|---|---|---|---|---|---|
| | 1 | 2 | 5 | 8 | 11 | 13 |
| Cost coefficient $a_i$ of the generator | 0.0038 | 0.0175 | 0.0625 | 0.0083 | 0.0250 | 0.0250 |
| Cost coefficient $b_i$ of the generator | 2 | 1.75 | 1 | 3.25 | 3 | 3 |

In one embodiment, it is assumed that a load of each node has slight flexibility around a value provided by the IEEE-30 system. Specifically, the cost function of a node provided with a load D (because power of the loaded node is reflected as net outflow, D<0) is constructed as: $C_i(p_i)=Mp_i^2-2MDp_i$, wherein an optimal value of $p_i$ is closer to D when a value of M is larger. In one embodiment, M can be M=50.

(3) Set a topology structure between the nodes: set a connection situation or physical connection relationship between the nodes. The IEEE-30 system shown in FIG. 5 provides the physical connection relationship between the nodes. In one embodiment, physically connected nodes can be set to exchange information with each other in communication. Specifically, the node i can notify other nodes connected thereto of a current status value (for example, $u_i$, $v_i$, $\lambda_i$, and $\gamma_i$) of each parameter or physical quantity thereof, and receive, from said other nodes, current status values of parameters or physical quantities corresponding to said other nodes.

(4) Construct a neural network, and set a parameter: construct the neural network on each node, and set the parameter related to the neural network. In one embodiment, the following neural network is constructed for each node:

$$\begin{cases} \eth \frac{d}{dt} x_i = P_{\Omega_i}(x_i - \nabla f_i(x_i) + A_i^T u_i - \nabla g_i^T(x_i) \lambda_i) - x_i \\ \eth \frac{d}{dt} u_i = -\sum_{j \in N_i} (u_i - u_j + v_i - v_j) - \left(A_i x_i - \frac{b}{m}\right) \\ \eth \frac{d}{dt} v_i = \sum_{j \in N_i} (u_i - u_j) \\ \eth \frac{d}{dt} \lambda_i = \left(\lambda_i + g_i(x_i) - \sum_{j \in N_i} (\gamma_i - \gamma_j + \lambda_i - \lambda_j)\right)^+ - \lambda_i \\ \eth \frac{d}{dt} \gamma_i = \sum_{j \in N_i} (\lambda_i - \lambda_j) \end{cases}$$

wherein, the decision variable $x_i = p_i$;
$\nabla f_i = 2a_i x_i + b_i$;
$A_i = 1$, $b = 0$;
$\Omega_i$ satisfies $\{x_i | p_i^{Min} \leq x_i \leq p_i^{Max}\}$;
$g_i = [g_{ij}, \ldots, g_{ij}, \ldots]^T$, $g_{ij} = S_{ij} p_i - L_j/m$, $j \in \text{Line}$;
the neural network parameter is set to $\eth = 10^{-4}$.

(5) Set an initial variable of the neural network: randomly select any real number for the initial status variable of the neural network of each node. In one embodiment, all initial values can be set to be 0, so as to facilitate calculation.

(6) Perform optimization by means of the neural network: perform distributed optimization solving by means of the neural network on the basis of the constructed real-time economic dispatch model. Eventually, the decision variable converges in a specific time, and auxiliary multipliers are consistent and converge to a steady state, thereby implementing the real-time solving of the neural dynamical method. In one embodiment, the 30 nodes are dispersed geographically, and each node has a privacy demand. Therefore, the system is applicable to the distributed optimization solving.

(7) Determine whether a termination condition is satisfied, wherein determination of the termination condition can comprise synchronous or sequential determination of one or more of the following conditions: whether a convergence precision is reached, whether a maximum calculation time is reached, and the like. In one embodiment, the convergence precision ε can be set to be $10^{-5}$, and δt is $10^{-4}$ seconds. That is, it is determined whether $$\sum_{i=1}^{m} \|x_i(t+\delta t) - x_i(t)\| < \varepsilon$$

is satisfied, and if the inequation is satisfied, that is, the iteration termination condition is satisfied, a status point $x_i(t)$ of a moment t is output as the calculation result.

Figure 6:
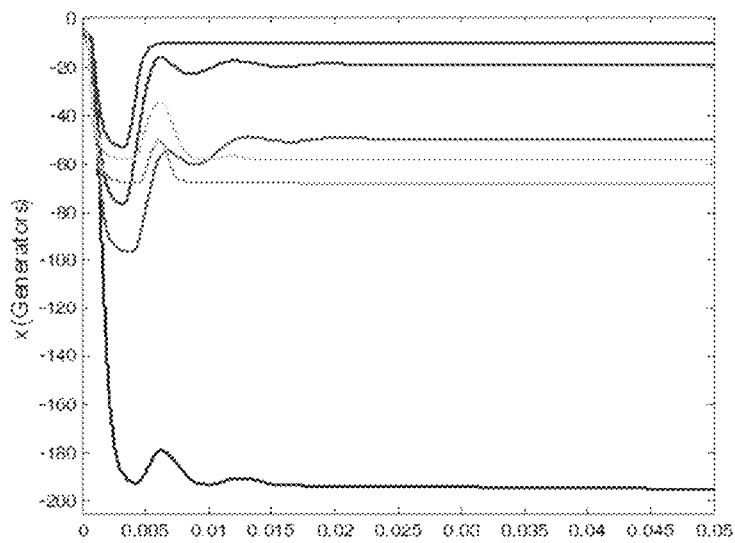
FIG. 6 is a display view of convergence situations of generator and load outputs according to one embodiment of the present invention.
Figure 6:
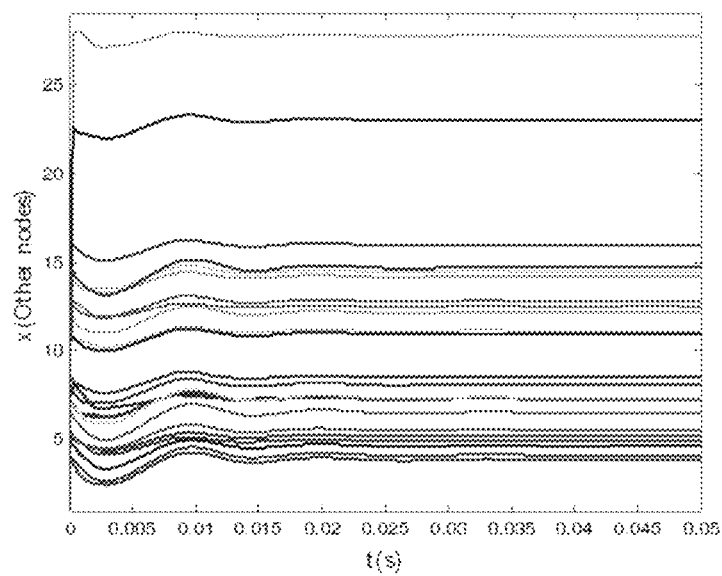

FIG. 6 shows convergence situations of generator and load outputs according to one embodiment of the present invention, and displays a change situation which is of the decision variable of each node and starts from an initial zero point. The decision variable converges in 0.05 seconds, that is, all of the generator outputs reach an optimal objective in the 0.05 seconds, which indicates that the present invention has better superiority in a convergence rate.

Figure 7:
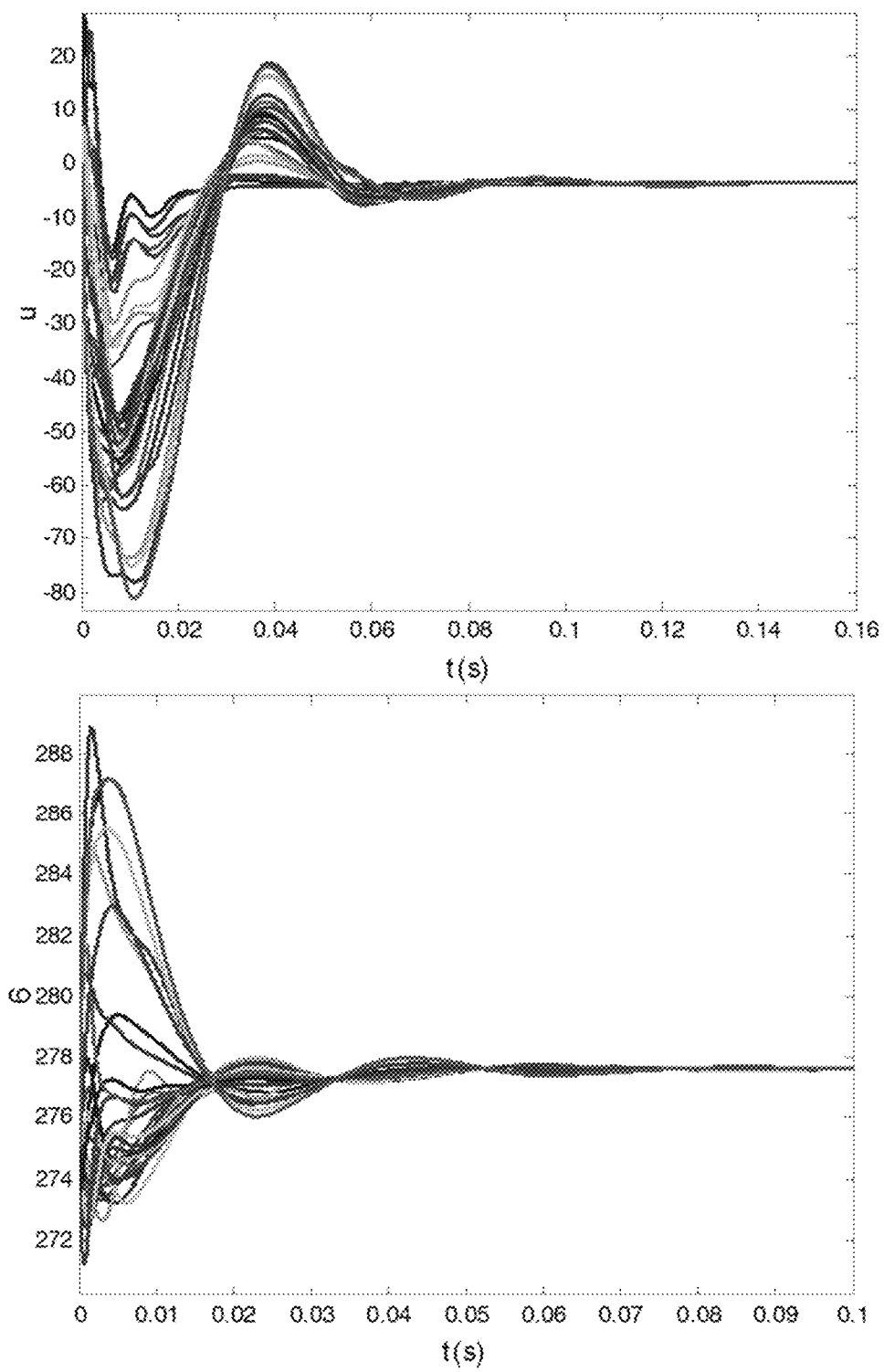
FIG. 7 is a display view of uniform convergence situations of Lagrangian multipliers of 30 nodes according to one embodiment of the present invention.

FIG. 7 shows uniform convergence situations of Lagrangian multipliers of the 30 nodes according to one embodiment of the present invention, and displays change situations of the auxiliary Lagrangian multipliers $u_i$ and $\lambda_i$ with respect to time. $u_i$ and $\lambda_i$ of the 30 nodes reach consistency and converge to a steady state in 0.15 seconds. The above description indicates that the neural dynamical method provided by the present invention has a real-time solving capability.

Figure 8:
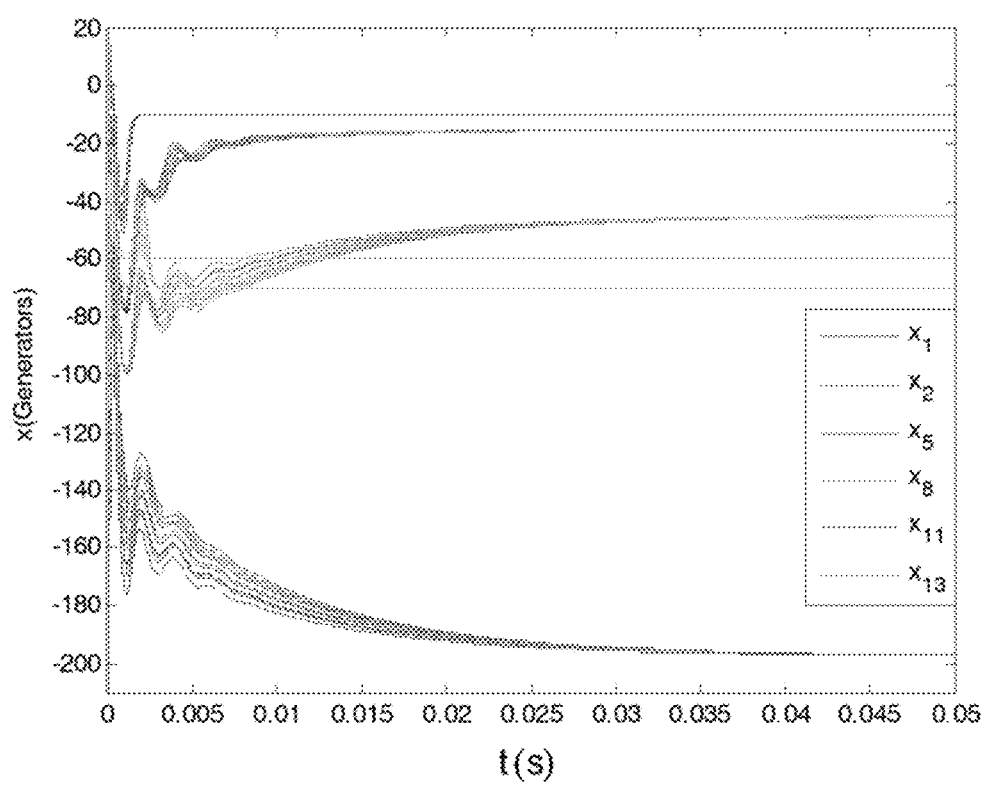
FIG. 8 is a display view of global convergence situations of generator output situations of all nodes.

FIG. 8 shows global convergence situations of generator output situations of all nodes. Any ten different initial value variables are selected to further indicate that the same global optimal solution can be obtained by converging from different initial points according to the method provided by the present invention, thereby indicating global convergence for different initial values in the method provided by the present invention.

In addition, in the method provided by the present invention, the convergence time is directly proportional to the neural network parameter, that is, when the related parameter is decreased in a certain multiple or scale, the convergence time can also be decreased in the same scale.

In different embodiments, an application situation is not limited to a situation in which the node cost is a convex quadratic function, and the method provided by the present invention can be used for the solving as long as the node cost is a convex function of the power injection thereof.

The preferred specific embodiments of the present invention have already been described above in detail. It shall be understood that one skilled in the art could make various modifications and variations according to the concept of the present invention without contributing any inventive labor. Therefore, any technical solution that could be obtained by one skilled in the art through logical analysis, reasoning or limited experiments according to the concept of the present invention based on the prior art shall be included in the protection scope defined by the Claims.

The invention claimed is:

1. A method for optimizing total load distribution of a power system, comprising the following steps:
step s1: determining system initial data, and describe the power system in forms of nodes, branches, and parameters, wherein a device of the power system as a node, and a line between two devices as a branch, and determining or inputting data of each node and branch and a value of each parameter;
step s2: determining an optimization objective and a constraint condition of the power system to construct a model for the optimizing total load distribution;
step s3: setting a topology structure between the nodes according to a physical connection relationship between the nodes;
step s4: constructing a neural network for each node, and set a parameter relating to the neural network;
step s5: setting an initial variable of the neural network corresponding to each node;
step s6: optimizing the corresponding node by means of the neural network;
step s7: determining whether a termination condition is satisfied, and output a result when the termination condition is satisfied, or repeat step s6 when the termination condition is not satisfied;
wherein the model is:

$$\min f(x) = \sum_{i=1}^{m} f_i(x_i)$$

$$\text{s.t.} Ax = b$$

$$g(x) \leq 0$$

$$x \in \Omega$$

wherein
$x_i$ represents a decision variable of each node, which is output of a generator;
$f_i$ represents an objective function on each node i, which is power generation cost minimization of the node;
$g(x) \leq 0$ is a global constraint satisfying additivity, and represents a line capacity, wherein $$g(x) := \sum_{i=1}^{m} g_i(x_i),$$

and $g_i : \Re^{n_i} \to \Re^r$ is convex in $\Omega_i$ (i=1, 2 ..., m);
Ax=b is a global constraint which can be decomposed into $$Ax = \sum_{i=1}^{m} A_i x_i,$$

and represents an energy balance between the nodes, wherein $A_i \in \Re^{p \times n}$, and $b \in \Re^p$ (0≤p≤n);
$x \in \Omega$, wherein $\Omega$ is a convex set, $x \in \Omega$ is equivalent to $x_i \in \Omega_i$ (i=1, 2, ..., m), and $\Omega = \Pi_{i=1}^{m} \Omega_i$, $\Omega_i$ (=1, 2 ..., m);
wherein the following neural network constructed for each node is:

$$\begin{cases} \partial \dfrac{d}{dt} x_i = P_{\Omega_i}(x_i - \nabla f_i(x_i) + A_i^T u_i - \nabla g_i^T(x_i)\lambda_i) - x_i \\ \partial \dfrac{d}{dt} u_i = -\sum_{j \in N_i}(u_i - u_j + v_i - v_j) - \left(A_i x_i - \dfrac{b}{m}\right) \\ \partial \dfrac{d}{dt} v_i = \sum_{j \in N_i}(u_i - u_j) \\ \partial \dfrac{d}{dt} \lambda_i = \left(\lambda_i + g_i(x_i) - \sum_{j \in N_i}(\gamma_i - \gamma_j + \lambda_i - \lambda_j)\right)^+ - \lambda_i \\ \partial \dfrac{d}{dt} \gamma_i = \sum_{j \in N_i}(\lambda_i - \lambda_j) \end{cases}$$

wherein

ò represents a direct scale factor, and ò>0;

$x_i$, $u_i$, $v_i$, $\lambda_i$, and $\gamma_i$ represent status vectors of an $RNN_i$ (a recursive neural network i);

∇ represents a differential gradient operator;

$N_i$ represents a vertex set of a neighboring network of the $RNN_i$, that is, $j \in N_i$ when and only when the node i and the node j are connected;

m represents a number of the nodes;

$P_\Omega$ represents a projection operator, and $$P_\Omega(\mu) = \arg \min_{\omega \in \Omega} \|\mu - \omega\|;$$

and all of the nodes satisfy the global constraint $$\sum_{i=1}^{m} A_i x_i = b$$

and the constraint $$g(x) = \sum_{i=1}^{m} g_i(x_i) \leq 0,$$

wherein $A_i \in \Re^{p \times n_i}$;

$b \in \Re^p$ (0≤p≤n);

$g_i : \Re^{n_i} \to \Re^r$ is convex in $\Omega_i$ (i=1,2 . . . ,m);

$f_i : \Re^{n_i} \to \Re^r$ is a local objective function on the node i;

the neural network on the each node exchanges $u_i$, $v_i$, $\lambda_i$, and $\gamma_i$ thereof with nodes connected thereto, and only a local objective $f_i$ on the node is optimized; and a global optimal solution can be obtained when all of the nodes are consistent on $u_i$, $v_i$, $\lambda_i$, and $\gamma_i$, so that a global objective $$\sum_{i=1}^{m} f_i(x_i)$$

is optimal when the constraint condition is satisfied.

2. The method according to claim 1, wherein the constraint condition comprises one or more of the following constraints: a power supply-demand balance constraint, a line power flow capacity constraint, and an upper-lower output limit constraint of each generator.

3. The method according to claim 1, wherein step s3 comprises:

setting physically connected nodes to exchange information with each other in communication, wherein the node can notify nodes connected thereto of a current status value of each parameter or physical quantity thereof, and receive, from the nodes connected thereto, current status values of parameters or physical quantities corresponding to said nodes.

4. The method according to claim 1, wherein step s7 comprises:

outputting the result when a convergence precision is reached; or reporting an error when the convergence precision is not reached and a maximum calculation time is reached; or repeating step s6 when the convergence precision is not reached and a maximum calculation time is not reached.

5. The method according to claim 1, wherein the neural network is implemented by means of a programmable circuit.

6. The method according to claim 1, wherein step s5 comprises:

an initial status of the neural network can be a value under a condition that continuity and convexity of the optimization problem and interconnection between the distributed network nodes are ensured.

7. The method according to claim 1, wherein step s7 comprises:

step s7a: determining whether the convergence precision is reached, that is, determining whether $$\sum_{i=1}^{m} \|x_i(t + \delta t) - x_i(t)\| < \varepsilon$$

is satisfied, and if it is satisfied, that is, the iteration termination condition is satisfied, outputting $x_i(t)$ of a moment t as the output result; otherwise, performing a next step of determination, wherein ε is a set iteration precision, and δt is an interval time;

step s7b: determining whether a calculation time t reaches the maximum calculation time $t_{max}$, and if the maximum calculation time $t_{max}$ is reached, end the operation; otherwise, repeating step s6.

* * * * *